(12) United States Patent
Robertson

(10) Patent No.: US 6,767,215 B2
(45) Date of Patent: Jul. 27, 2004

(54) LEARNING STATION

(76) Inventor: Barbara Robertson, 2631 Kyle Ave. North, Minneapolis, MN (US) 55422

( * ) Notice: Subject to any disclaimer, the term of this patent is extended or adjusted under 35 U.S.C. 154(b) by 0 days.

(21) Appl. No.: 10/267,523

(22) Filed: Oct. 9, 2002

(65) Prior Publication Data
US 2003/0073062 A1 Apr. 17, 2003

Related U.S. Application Data

(60) Provisional application No. 60/329,237, filed on Oct. 12, 2001.

(51) Int. Cl.[7] .............................................. A47B 39/00
(52) U.S. Cl. ..................... 434/432; 434/430; 434/433; 434/322; 40/539; 40/124.2; 248/174
(58) Field of Search ................................ 434/408, 430, 434/432, 238, 433, 309; 40/430, 539, 124.2; 108/27, 60; 248/174

(56) References Cited

U.S. PATENT DOCUMENTS

| 2,867,045 A | * | 1/1959 | Millgate | 434/426 |
| 3,556,047 A | * | 1/1971 | Wassell | 116/322 |
| 3,629,960 A | * | 12/1971 | Roush | 434/429 |
| 3,659,355 A | * | 5/1972 | Aubin, Jr. | 434/408 |
| 4,010,553 A | * | 3/1977 | Bennett | 434/338 |
| 4,759,520 A | * | 7/1988 | Levine | 248/174 |
| 4,776,799 A | * | 10/1988 | Walsh | 434/238 |
| 5,131,849 A | * | 7/1992 | Perrero | 434/281 |
| 5,775,919 A | * | 7/1998 | Gardner | 434/408 |
| 6,039,576 A | * | 3/2000 | Gabig et al. | 434/367 |

* cited by examiner

Primary Examiner—Derris H. Banks
Assistant Examiner—Dmitry Suhol
(74) Attorney, Agent, or Firm—Kinney & Lange, P.A.

(57) ABSTRACT

An activity station and method of learning for reinforcing skills taught by a teacher or institutional assistant to students. The activity station is comprised of a board with folds that, when open, will stand erect and reveals instructions and activities for the student. A student's progress through the activities is tracked, and the student's performance is evaluated by completing skill sheets. The activity station can then be closed to conceal the instructions and activities for ease in storage.

7 Claims, 12 Drawing Sheets

Student Management Card

Name_____

| PRACTICE ACTIVITY | SKILL SHEETS |
|:---:|:---:|
| 1 | 1 & 2 |
| 2 | 3 & 4 |
| 3 | 5 & 6 |
| 4 | 7 & 8 |
| 5 | 9 & 10 |
| 6 | 11 & 12 |

Picture Set 25

| 25 utility pole<br>u til' ĭ tē pōl | 25 street signs<br>strēt sīns | 25 manhole cover<br>măn' hōl kŭv' ŭr | 25 street strēt<br>road rōd |
|---|---|---|---|
| 25 car kär<br>automobile<br>ô tē mē bēl | 25 house hous<br>dwelling<br>dwĕl' ĭng | 25 foot bridge<br>fŏŏt brĭj | 25 curb<br>kŭrb |
| 25 fire hydrant<br>fīer hī drănt | 25 driveway<br>drīv' wā | 25 walking path<br>wŏk' ĭng păth<br>trail<br>trāl | 25 frozen creek<br>frō' zĕn crēk |

*FIG. 7b*

Name _____ SSS M 3 Math Practice 1. 35   29   52   98   82   44   23
   +23  -13  +14  -63  -11  +55  +56

2. 57   49   28   41   83   56   39   83
   -23  -36  +30  +52  -42  -43  -16  -62

3. 48   37   46   53   26   48   58   29
   -26  -26  +43  +14  +31  -31  -43  +10

4. 6   7   3   5   8   4   9   4   6   7
   +5  +4  +9  +8  +6  +6  +5  +9  +6  +7

5. 96   53   86   47   96   85   35   99
   -35  -11  +13  +21  -14  +13  +61  -86

56

SMARTIME

LEARNING STATION

CROSS-REFERENCE TO RELATED APPLICATION(S)

This application claims priority from U.S. Provisional Application No. 60/329,237 filed Oct. 12, 2001 for LEARNING STATION.

BACKGROUND OF THE INVENTION

One of the best ways for students to retain lessons taught by a teacher is through repetition. Practicing a skill again and again reinforces the information and helps students to become proficient at the skill. Some students may require more practice than others, and the teacher can not always be available to help individual students that need more practice. Moreover, students may quickly become bored with simply doing additional workbook or worksheet exercises or looking at a computer screen and pressing a key. That becomes tedious. Teachers, therefore, need a learning tool that will provide practice for students to reinforce and maintain skills and information without the students becoming bored. In addition, it must be an economical solution that does not require a large budget, and it should also be durable and useful for years.

BRIEF SUMMARY OF THE INVENTION

The invention is an activity station and method of learning for reinforcing skills taught to students by a teacher. The activity station is a board that will fold to conceal the front and, when open, will reveal the front and stand erect. The board is divided into zones that contain holders for holding materials that the students and teachers will use. Removable labels allow teachers to easily change the topic which the activity board will address.

BRIEF DESCRIPTION OF THE DRAWINGS

FIG. 5 is a management card.

FIG. 7b shows the back side of sample activity flash cards.

DETAILED DESCRIPTION

Figure 1:
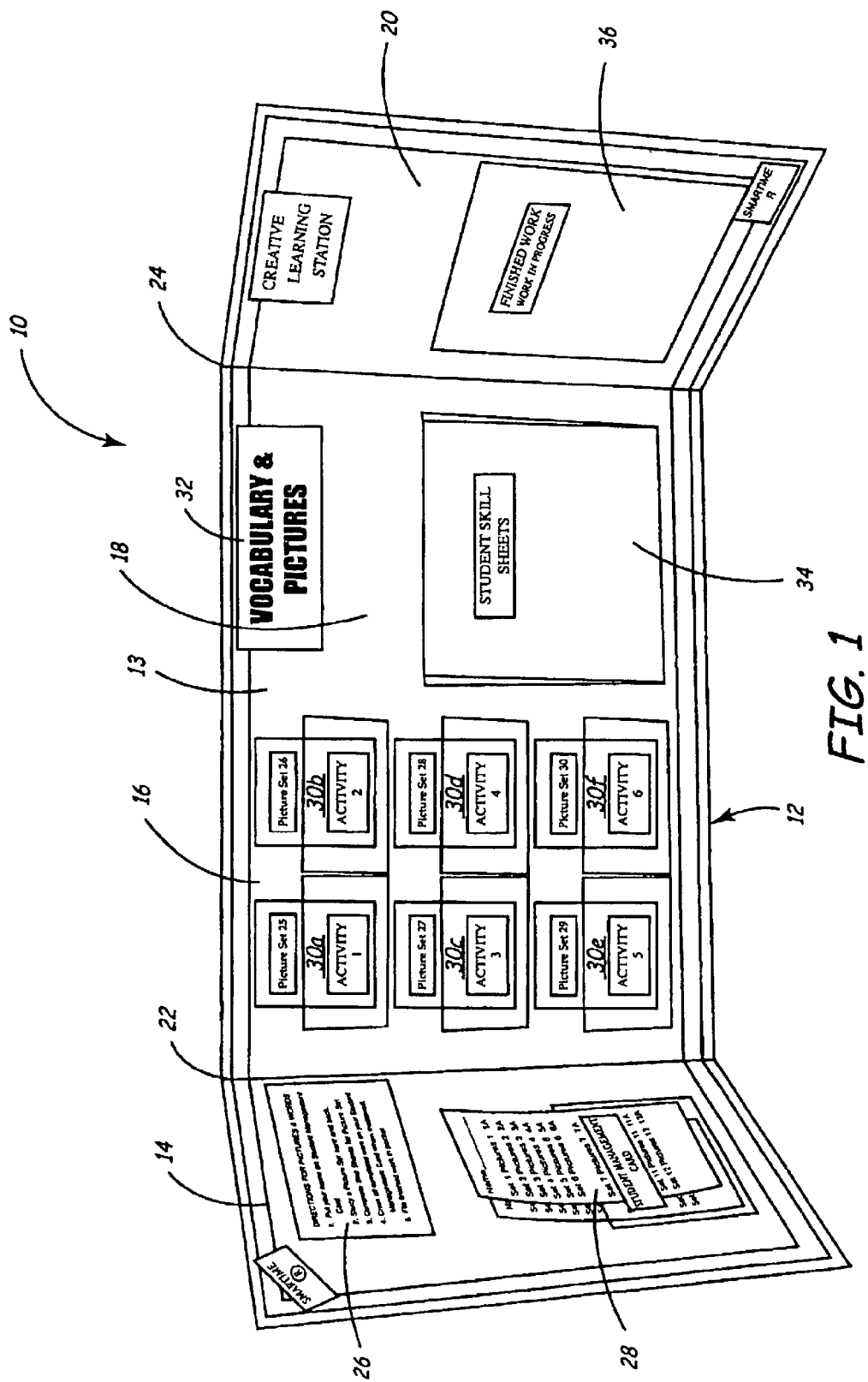
FIG. 1 is a perspective view of the opened and erect activity station arranged in its preferred embodiment.
Figure 2:
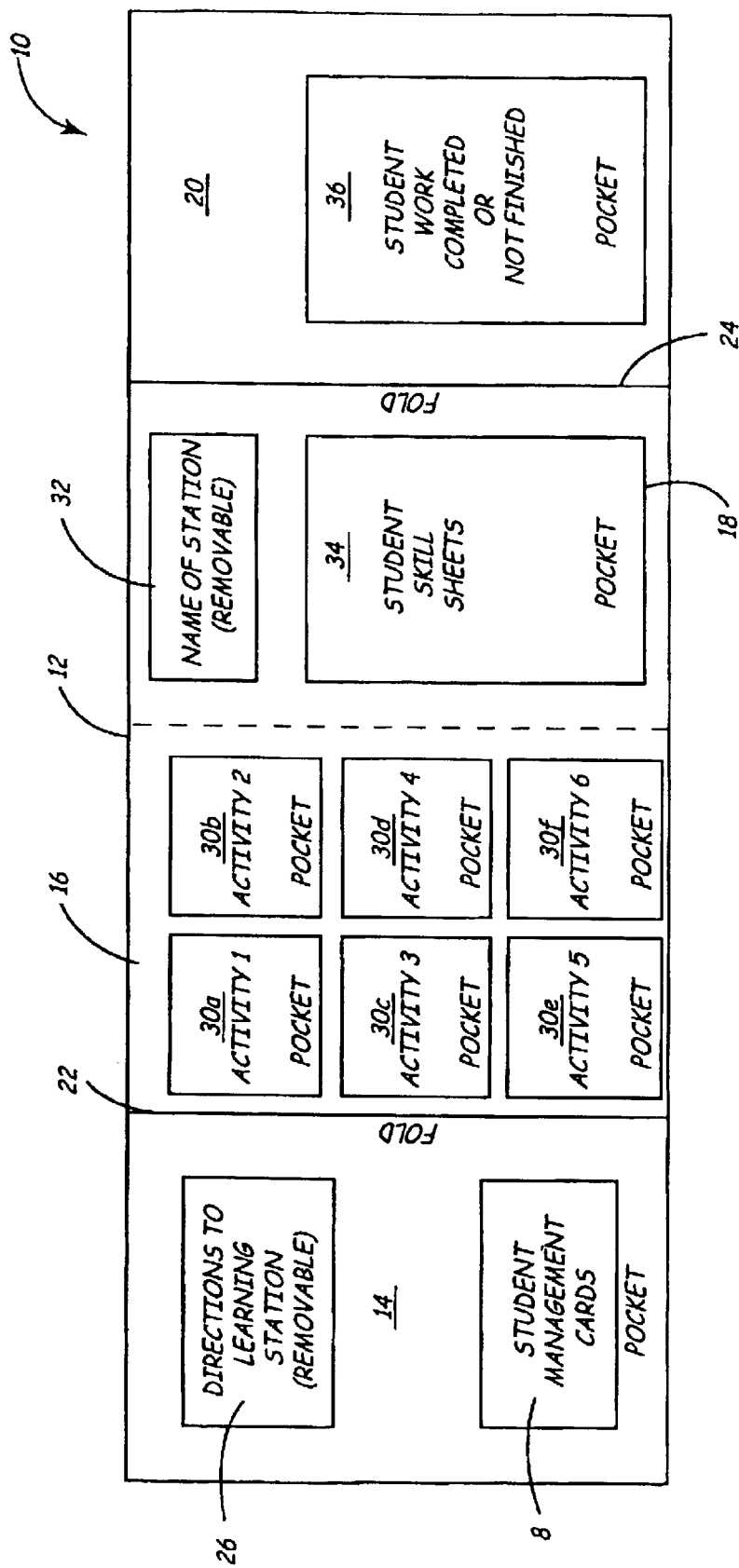
FIG. 2 is a schematic diagram of the preferred arrangement.

FIGS. 1 and 2 show a preferred embodiment of activity station 10. Activity station 10 includes board 12 with front 13, instruction zone 14, activity zone 16, skill sheet zone 18, work product zone 20, and folds 22 and 24. Instruction zone 14 additionally includes removable directions label 26 and management card holder 28. Activity zone 16 contains activity holders 30a–30f. Skill sheet zone 18 includes removable title label 32 and skill sheet holder 34. Lastly, work product zone 20 additionally contains work product holder 36.

Figure 3:
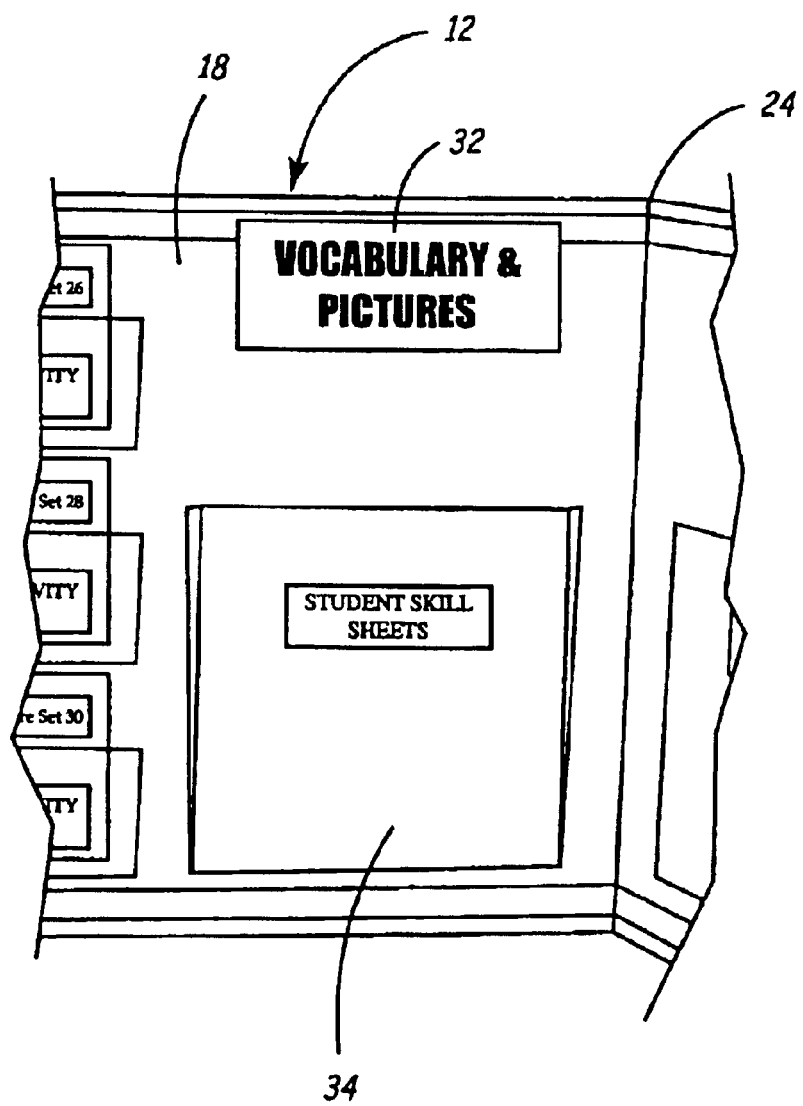
FIG. 3 is a perspective view of the skill sheet zone of the activity station.
Figure 4:
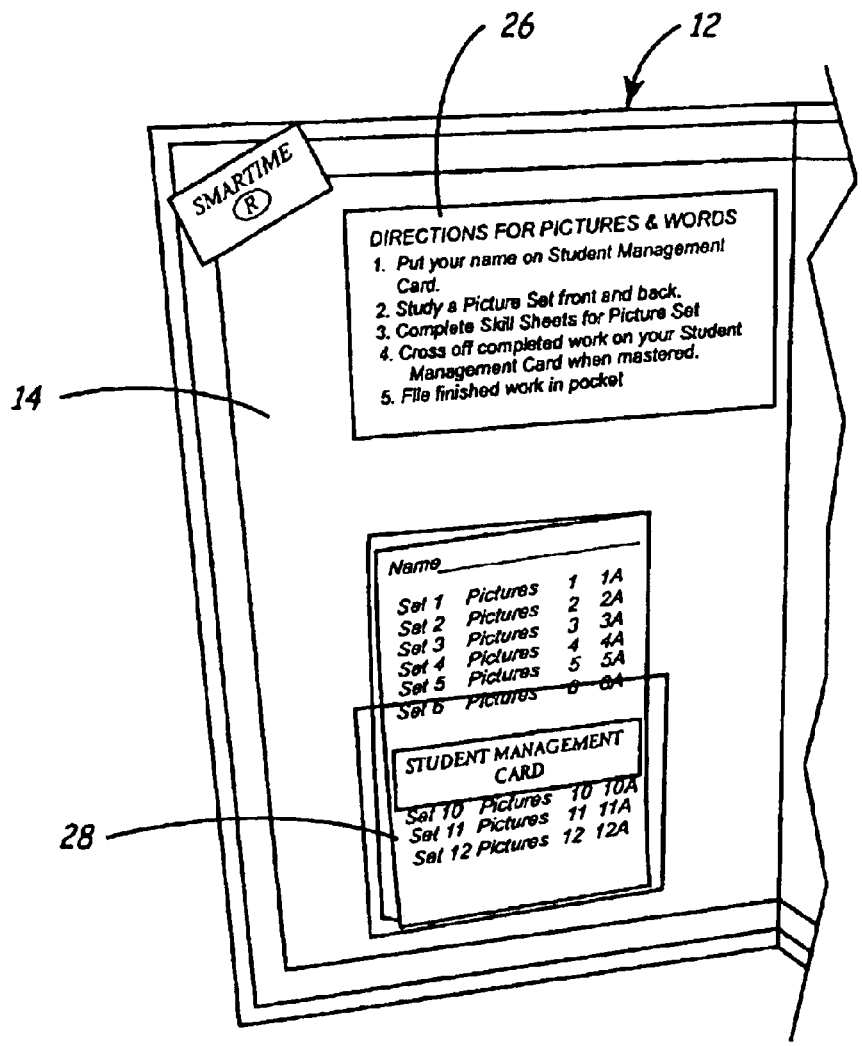
FIG. 4 is a perspective view of the instruction zone of the activity station.

In operation, a person, such as a teacher or institutional assistant, attaches removable title label 32 to skill sheet zone 18 shown in FIG. 3. A different removable title label 32 is provided for each subject that activity station 10 addresses. The teacher, thus, attaches the appropriate removable title label 32 for the corresponding subject. The teacher also attaches the appropriate removable directions label 26 to instruction zone 14 shown in FIG. 4. Preferably, removable labels 26 and 32 are attached by a hook-and-loop closure, but any type of removable attachment means can be used. This is economical, because the same activity station 10 is used for all subjects and can be easily changed. If, however, only one subject will always be used for an activity station 10, removable labels 26 and 32 may be permanently attached.

Management cards 38, one example of which is shown in FIG. 5, are placed in management card holder 28. Students and teachers use management cards 38 to track the student's progress. To fit the needs of the subject matter being taught, management cards 38 may vary somewhat from that shown in FIG. 5, but the function is essentially the same. Students enjoy seeing their progress, and management cards 38 are a good way to note accomplishments. Management cards 38 can also be stapled to finished work and sent home with the students.

Figure 6:
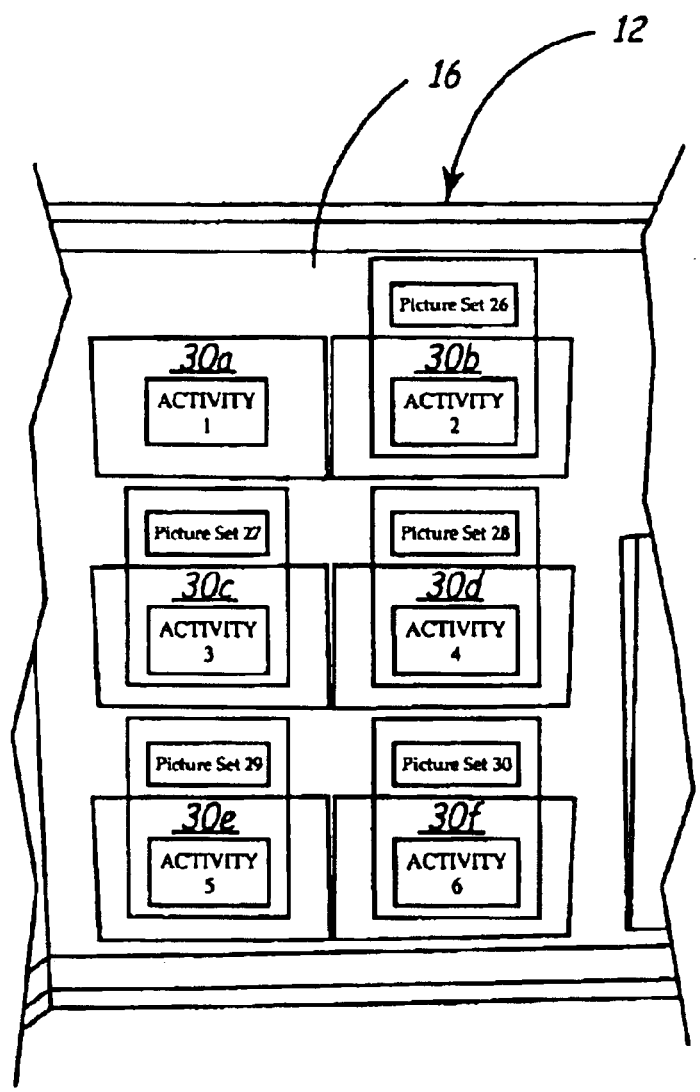
FIG. 6 is a perspective view of the activity zone of the activity station.
Figure 7A:
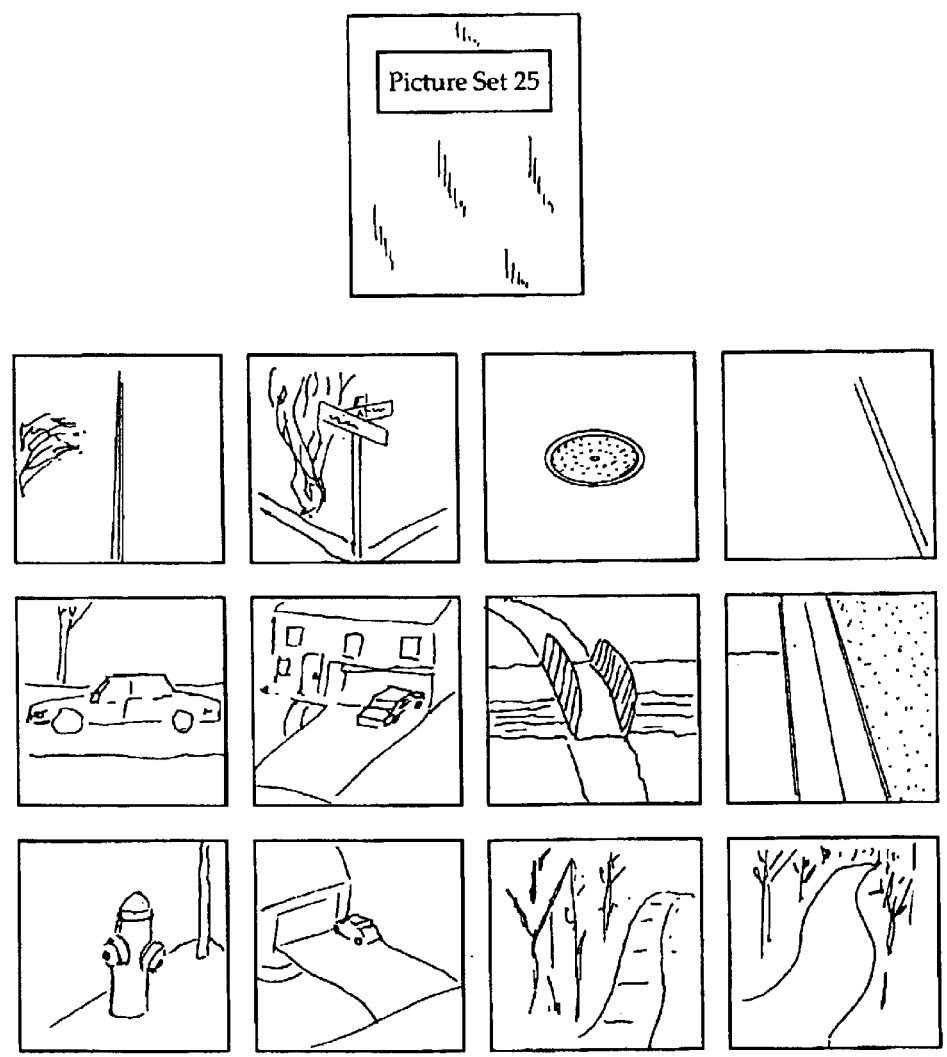
FIG. 7a shows the front side of sample activity flash cards.
Figure 8A:
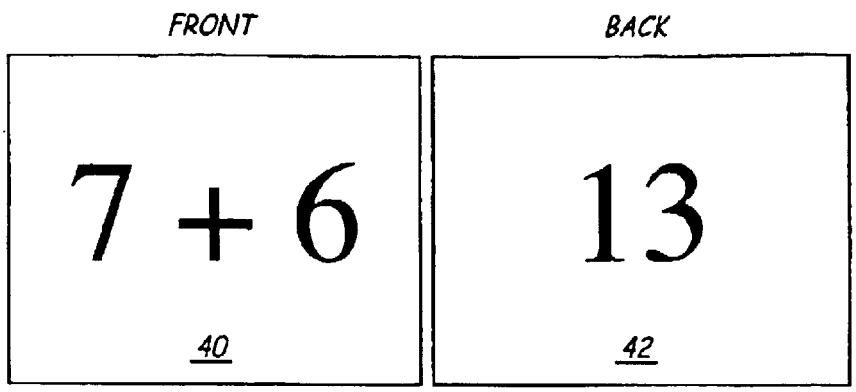
FIGS. 8a, 8b, 8c, and 8d are the front and back sides of sample activity flash cards.
Figure 8B:
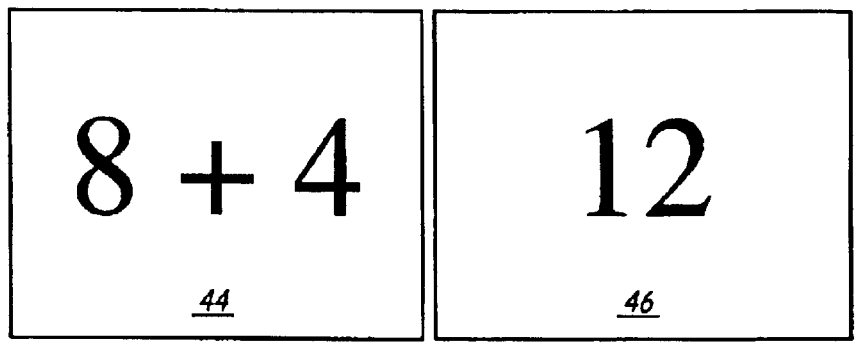
Figure 8C:
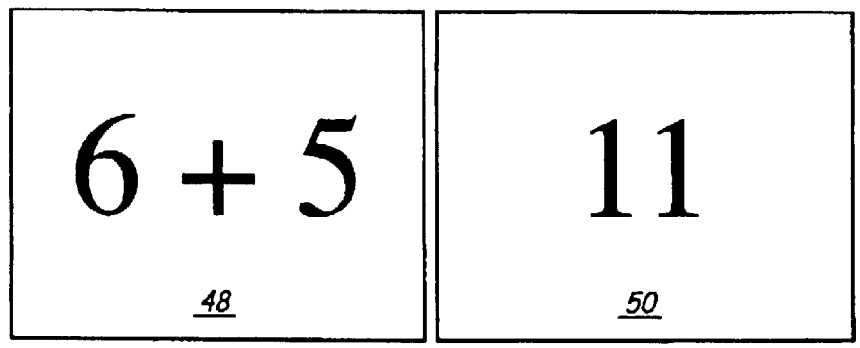
Figure 8D:
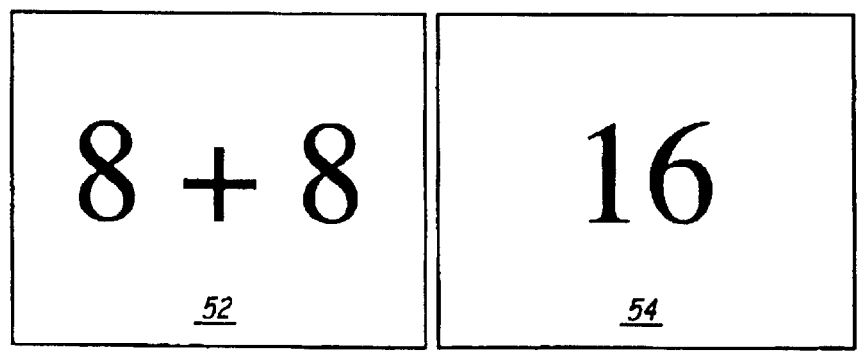
Figure 9:
FIG. 9 is a sample skill sheet.

The teacher then fills activity holders 30a–30f, shown in FIG. 6, with the appropriate activities for the subject matter being taught. FIGS. 7a and 7b show one type of example activity. FIG. 7a shows the front side of a set of flash cards. Each flash card has a picture of different subject matter on it. FIG. 7b shows the back side of each flash card. One or more vocabulary words with phonetic spelling are given that correspond to the picture on the front side. Preferably, each flash card is labeled, such as with a number (25 in FIG. 7b) or color coded, to correspond to the set of flash cards the flash card belongs to. If the flash cards are emptied from activity holders 30a–30f and become mixed together, the numbered label or color coding makes it easy to sort them again.

FIGS. 8a–8d show another type of example activity. Here, FIGS. 8a–8d are flash card-type activities to reinforce math skills. Inquiries are presented on front side 40, 44, 48, and 52 of the cards, and answers are provided on back side 42, 46, 50, and 54, respectively, of the cards.

Figure 10:
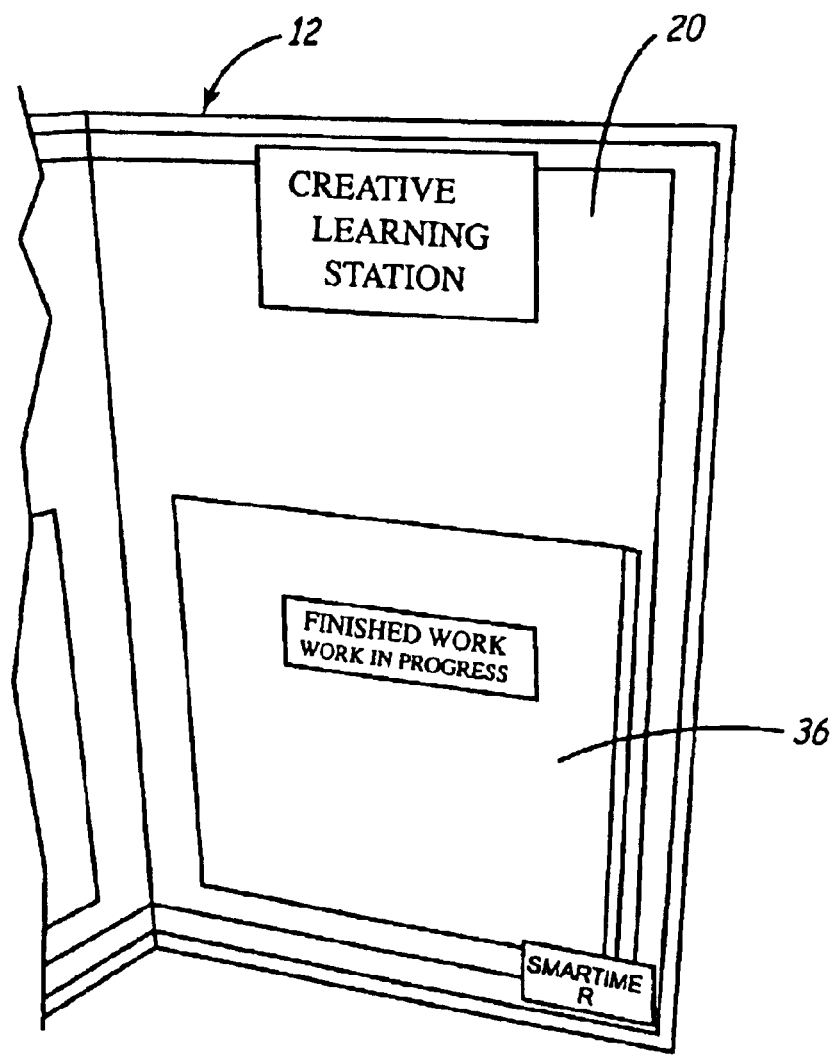
FIG. 10 is a perspective view of the work product zone of the activity station.

The teacher lastly places skill sheets 56, one example of which is shown in FIG. 10, in skill sheet holder 34 (FIG. 3). At this point, activity station 10 is set up for student use.

Activity station 10 is preferably arranged such as shown in FIGS. 1 and 2 for ease of use. Each label and holder is positioned such that the student begins on one side of activity station 10 and progresses to the other side. However, removable labels 26 and 32 and holders 28, 30a–30f, 34, and 36 may be arranged differently than that shown in FIGS. 1 and 2 and still function as described above.

To use activity station 10, students remove management cards 38, shown in FIG. 5, from management card holder 28 and fill in their name. Management card 38 is stored in management card holder 28 until the student has completed activity station 10, so that the student or teacher can track progression. Each time the student completes an activity, it is recorded on management card 38. This makes coming to activity station 10 an on-going project.

The student practices activities, such as in FIGS. 7a, 7b, and 8a–8d until the student feels proficient. The student completes corresponding skill sheet 56 and places it into work product holder 36, shown in FIG. 10. The teacher corrects these in order to determine whether more practice in that subject area is required. The teacher may then supplement activity station 10 with materials he or she already has.

Figure 11:
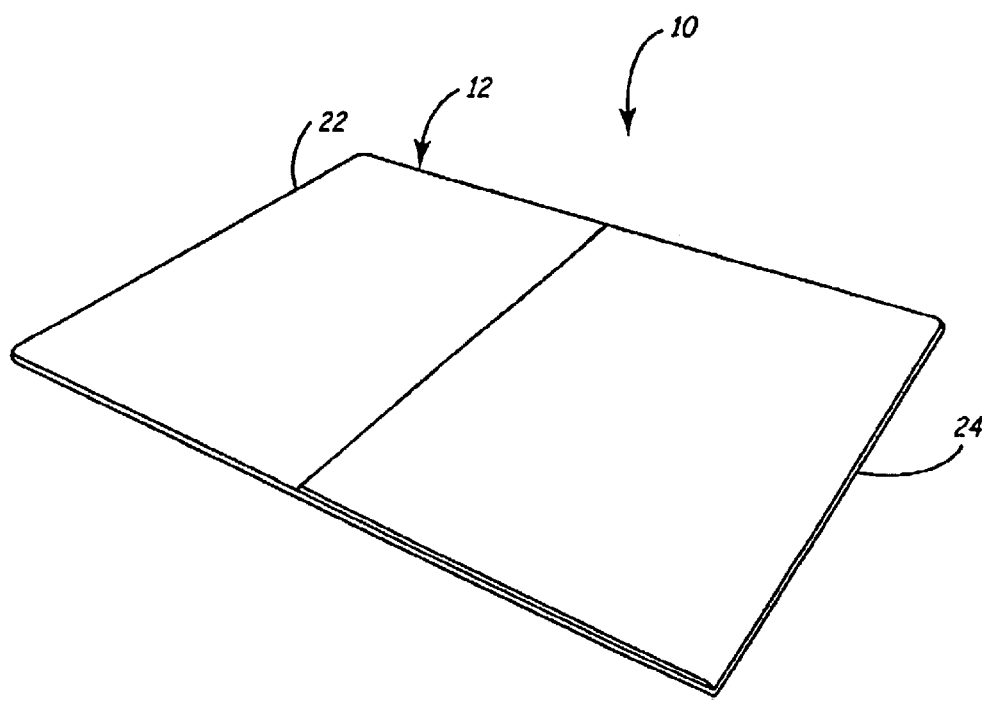
FIG. 11 is a perspective view of the activity station when closed.

FIG. 11 shows activity station 10 when closed and not in use. Board 12 is folded along folds 22 and 24, so that activity station 10 is closed and front 13 is concealed. Thus, activity station 10 can easily be stored in a relatively small area. In a crowded work area, activity station 10 may only come out at specific times. It is also easily moved between classrooms.

Preferably, additional sets of activities like those shown in FIGS. 7a, 7b and 8a–8d and skill sheets 56 are available. The teacher may then switch activities and skill sheets to provide more interest, variety, and opportunity to practice and learn to the students.

In the preferred embodiment, board 12 is vinyl coated and holders 28, 30a–30f, 34, and 36 are plastic pockets that are heat sealed to front 13 of board 12. Each pocket may or may not be labeled. These materials are sturdy and easily cleaned. However, activity station 10 may be constructed of many types of materials including cardboard and paper. Preferably, when open for use, board 12 has a width of about 48 inches and a height of about 18 inches. Instruction zone 14 and work product zone 20 each have a width of about 12 inches and a height of about 18 inches. Activity zone 16 and skill sheet zone 18 together have a width of about 24 inches and a height of about 18 inches. These dimensions allow commonly used 8 inch×11 inch paper to be used and easily stored in activity station 10. Also, the tri-fold style allows it to easily and firmly stand erect. When closed, board 12 has a width of about 24 inches and a height of about 18 inches.

Activity station 10 is preferably used to reinforce information taught by a teacher. Thus, students can better learn and retain skills in various subject areas. Some of the subject areas for which activity station 10 can be used are Reading, Writing and Listening; The Five Senses; Reading/Phonics; Math; English as a Second Language; Adult Basic Education; and The Fifty States. One activity station 10 can be used for all subjects simply by changing removable labels 26 and 32, activities in holders 30a–30f, management cards 38, and skill sheets 56.

Although the present invention has been described with reference to preferred embodiments, workers skilled in the art will recognize that changes may be made in form and detail without departing from the spirit and scope of the invention.

What is claimed is:

1. An activity station for educational purposes, the activity station comprising:
   a board having a front and back and folds, which when folded conceals the front of the board and when open reveals the front of the board and allows the board to stand erect, the board also having removable labels;
   a plurality of activity sets that provide practice in a subject;
   a plurality of skill sheets that provide testing in the subject;
   a plurality of management cards that track progress of the testing in the subject;
   an activity zone having at least one activity set holder supported by the board for storing the activity sets;
   a skill sheet zone having a skill sheet holder supported by the board for storing the skill sheets;
   a work product zone having a work product holder supported by the board for storing incomplete and completed skill sheets; and
   an instruction zone having a management card holder supported by the board for storing the management cards.

2. The activity station of claim 1 wherein each activity set has an identifying label.

3. The activity station of claim 1 wherein the plurality of activity sets are on a plurality of topics and are exchangeable within the activity set holder so that the same activity station can be used for different topics.

4. The activity station of claim 1 wherein the plurality of skill sheets are on a plurality of topics that are exchangeable within the skill sheet holder so that the same activity station can be used for different topics.

5. An activity station for educational purposes, the activity station comprising:
   a board having a front and a back and folds, wherein the board has an instruction zone, an activity zone, a skill sheet zone, and a work product zone;
   a plurality of management cards that track progress of testing of a subject;
   a plurality of activity sets that provide practice in the subject;
   a plurality of skill sheets that provide testing of the subject;
   a management card holder for storing the plurality of management cards in the instruction zone;
   a plurality of activity set holders for storing the plurality of activity sets in the activity zone;
   a skill sheet holder for storing the plurality of skill sheets in the skill sheet zone;
   a work product holder for storing incomplete and completed skill sheets in the work product zone;
   a removable directions label in the instruction zone; and
   a removable title label in the skill sheet zone.

6. The activity station of claim 5 wherein the management cards, activity sets and skill sheets are on a plurality of subjects and exchangeable on the activity station such that the activity station can be used for a plurality of subjects.

7. The activity station of claim 6 and further comprising:
   a plurality of removable directions labels;
   a plurality of removable title labels; and
   wherein the plurality of removable directions labels and plurality of removable title labels are designated for each subject.

* * * * *